Patented Apr. 11, 1950

2,504,088

UNITED STATES PATENT OFFICE 2,504,088

PREPARATION OF IODOANTHANTHRONES

David I. Randall, Phillipsburg, N. J., assignor to General Aniline & Film Corporation, New York, N. Y., a corporation of Delaware No Drawing. Application September 13, 1947, Serial No. 773,933

7 Claims. (Cl. 260—359)

This application relates to an improved process for the preparation of iodoanthanthrones and derivatives thereof, particularly those containing other halogens as nuclear substituents.

Nuclear iodination of aromatic compounds of highly condensed nuclear structure, and particularly of vat dyes and intermediates of the anthraquinone series, by reaction with iodine or reagents adapted to liberate iodine under the reaction conditions employed, is relatively difficult to carry out as compared with chlorination or bromination.

Various proposals have been made to promote iodination of such compounds, for example, by use of special reaction media, halogenation catalysts, and by controlling the reaction temperature. However, attempts to obtain iodinated anthanthrones and derivatives thereof, such as those containing other halogens as nuclear substituents, by methods heretofore proposed have proven unsuccessful in that the yields obtained were so small as to render such procedures entirely unsatisfactory from an economic standpoint for commercial practice.

Thus, U. S. Patent No. 1,926,155 to Kunz et al. discloses reaction of chlor- or bromanthanthrone with iodine, and of anthanthrone with bromoiodide to form chlor- or brom-iodoanthanthrone; and German Patent No. 495,367 discloses reaction of anthanthrone with iodine to form di-iodoanthanthrone, said reactions being carried out by heating the reagents together in strong oxygen containing mineral acids capable of dissolving the anthanthrone intermediate (e. g. concentrated sulfuric acid, oleum or a mixture of sulfuric acid and phosphorus pentoxide) with or without a halogen carrier such as sulfur, phosphorus, iron or antimony, or compounds thereof.

As disclosed by Corbellini et al. (La Chimica e L'Industria, volume XVIII, pages 295–298: 1936), the procedure for preparing di-iodo-anthanthrone disclosed in German Patent No. 495,367 yielded only a partly iodinated product which, after repeated recrystallization, contained only 10.4% of iodine instead of the 45.6% theoretically contained in di-iodanthanthrone. Similarly, in an attempt to carry out the preparation of brom-iodoanthanthrone according to U. S. Patent No. 1,926,155, I have obtained only insignificant amounts of iodinated anthanthrone compounds. The impure reaction product was made up of a mixture of monobrom-, dibrom- and bromiodo-anthanthrone, which was exceedingly difficult to separate, and from which a yield of only 5% of theory of bromiodo-anthanthrone could be recovered by repeated recrystallization.

Nuclearly iodinated anthanthrones and derivatives thereof, particularly those containing other halogens as nuclear substituents, are valuable dyestuffs yielding brilliant shades on cellulosic fiber when applied by vat dyeing procedures. However, the processes heretofore known for preparation of these compounds were entirely unsatisfactory from the standpoint of economy for commercial practice.

I have now discovered a method of producing iodo-anthanthrones and derivatives thereof containing other halogens as nuclear substituents, wherein the desired products are obtained in high yields which are entirely satisfactory for commercial production, and wherein the desired compounds are produced in a relatively high state of purity so that their recovery from the reaction mixture is greatly facilitated.

Thus, I have found that anthanthrone compounds, particularly anthanthrone and its derivatives containing other halogens such as bromine or chlorine as nuclear substituents, can be readily converted to the corresponding iodoanthanthrones or iodohalo-anthanthrones in good yields, by heating said compounds with iodine (or reagents yielding iodine under the reaction conditions) in oleum, preferably having a concentration of 1 to 12% of $SO_3$, at elevated temperatures, preferably from 110–150° C., in a closed reaction vessel under superatmospheric pressure corresponding at least to the autogenous pressure of the reaction mixture under the conditions of the reaction, for example, pressures of at least 70 pounds per square inch above atmospheric pressure. By carrying out the reaction under pressure in the aforesaid manner, I have obtained yields of monoiodo-anthanthrones of the order of 60% of the theory, and of di-iodo-anthanthrone in yields of about 40% of the theory. Moreover, in the preparation of iodinated anthanthrones containing other halogens, such as bromine, in the nucleus by simultaneous reaction of anthanthrone with iodine and bromine, I have found that monoiodo- monobromo-anthanthrone can be obtained in a relatively pure state without such excessive proportions of mono- and di-bromanthanthrone as would interfere with isolation of the desired product.

As starting materials for my improved process, I prefer to employ as anthanthrone compounds, anthanthrone, its halogenated derivatives containing halogens such as chlorine or bromine as nuclear substituents, or the corresponding 1,1'-dinaphthyl-8,8'-dicarboxylic acids which yield anthanthrones by ring closure under the conditions of the reaction.

As a reaction medium, I employ oleum of low or moderate $SO_3$ content, preferably containing 1 to 12% of $SO_3$. The use of concentrated sulfuric acid or of oleum containing less than 1% $SO_3$ results in relatively poor yields, while if the $SO_3$ concentration is increased substantially above 12%, serious losses in yield occur as the result of side reactions, particularly sulfonation. Thus, optimum results have been obtained with oleum containing 3 to 8% of $SO_3$.

The proportion of the anthanthrone intermediate or of the corresponding 1,1'-dinaphthyl-8,8'-dicarboxylic acid with reference to the amount of oleum employed may vary, but in general satisfactory results have been obtained by using an amount of anthanthrone intermediate equal to 8 to 10% of the amount of oleum employed.

As the iodinating agent I employ iodine, or reagents yielding iodine, in the reaction mixture. For example, the latter compounds include compounds of iodine with chlorine or bromine when chlorination or bromination of the anthanthrone compound is to be carried out simultaneously with iodination. In general, it is desirable to employ an amount of iodinating agent, particularly iodine, moderately in excess of the amount theoretically required for reaction with the anthanthrone intermediate to produce the desired iodinated product, for example an excess of about 15 to 30%. Other halogens, if employed in the reaction mixture, are preferably used in amounts ranging from the theoretical amount required for production of the desired compound to about 20% in excess thereof.

In accordance with my invention, the reaction is carried out in a closed vessel, for example a glass-lined reactor, adapted to withstand at least the pressure autogenously generated during the reaction. After introducing the reaction mixture into the closed reaction vessel, the contents of the latter are heated at a temperature of 110 to 150° C., and preferably at 120 to 140° C., until halogenation is substantially complete, requiring, for example, 5 to 20 hours. During the reaction, the pressure rises generally to about 70 pounds per square inch or more (e. g. 70 to 80 pounds per square inch) above atmospheric pressure.

When the iodination is complete, the iodoanthanthrone product can be conveniently recovered from the reaction mixture after allowing the latter to cool and releasing the pressure in the closed reaction vessel, by drowning the reaction mixture in ice and separating the insoluble reaction product thereby precipitated. The product is advantageously purified, for example, by slurring with dilute aqueous alkali and then with dilute alkaline hypochlorite solution, and recovered the purified product by filtration and washing of the filter cake.

The iodoanthanthrones thus obtained dye cellulosic fiber, particularly cotton, in brilliant violet to scarlet shades, when applied to the material by conventional vat dyeing procedures.

The following examples, wherein parts and percentages are by weight, temperatures are in degrees centigrade and pressures are expressed as gauge pressure (in excess of atmospheric pressure), will serve to illustrate the method of preparing iodoanthanthrones in accordance with my invention

Example 1

A solution made up of 27.6 parts of 1,1'-dinaphthyl-8,8'-dicarboxylic acid, 156 parts of 100% sulfuric acid, and 147 parts of fuming sulfuric acid containing 16% of $SO_3$, was charged into a glass-lined pressure reaction vessel, and 7.8 parts of bromine and 13.0 parts of iodine were added thereto. The reaction vessel was closed and the mixture heated at 125 to 130° for 6 hours. A pressure of 75 pounds per square inch was thereby developed in the reactor. The reaction mixture was allowed to cool, the pressure released, and the mixture poured into 1500 parts of a mixture of ice and water. The reaction product thereby precipitated was recovered by filtration and washed with water until neutral. For purification, the resulting filter cake was slurred with 1000 parts of a 2.5% aqueous solution of caustic soda to dissolve minor amounts of sulfonated material, and the slurry was again filtered. The resulting press cake was then slurred at 90° for about 45 minutes with dilute aqueous sodium hypochlorite solution, the mixture filtered, and the press cake washed with water. 25 parts of iodobrom-anthanthrone (corresponding to a yield of 61.5% of theory) was thus obtained. The product dyed cotton fabrics, when applied by conventional vat dyeing procedures, in bright scarlet shades of excellent fastness to light.

In carrying out a reaction similar to that of the foregoing example, except that the reaction was carried out at atmospheric pressure, 22 parts of an impure product containing substantial proportions of bromoanthanthrone and dibromoanthanthrone, together with bromoiodo-anthanthrone, were obtained. Cotton fabrics were dyed a weak golden yellow shade when this product was applied thereto by conventional vat dyeing procedures. Upon repeated crystallization of the product from sulfuric acid, iodobromo-anthanthrone was obtained in a yield of about 5% of theory, and having dyeing properties identical with those obtained with the product of the foregoing example.

Example 2

A solution made up of 8.6 parts of anthanthrone and 105 parts of oleum containing 3.4% $SO_3$ was charged into a glass-lined pressure reaction vessel, and 2.2 parts of bromine and 4.1 parts of iodine were added. The reaction vessel was closed, and the contents thereof heated at 130° for 6 hours. A pressure of 75 pounds per square inch was developed during the reaction. The reaction mixture was then allowed to cool, the pressure released, and the reaction product recovered and purified by the procedure of Example 1. 7.6 parts of iodobromo-anthanthrone (corresponding to a yield of 60% of theory) were obtained, having identical properties with those of the product of Example 1.

A reaction carried out under similar conditions, except that atmospheric pressure was maintained and the iodine was added in small portions during the course of the reaction, yielded 7.4 parts of an impure product which dyed cotton in weak golden yellow shades, when applied by vat dyeing processes. Purification of this product by repeated crystallization from sulfuric acid yielded iodobromo-anthanthrone in an amount corresponding to 5% of theory, having identical properties with those of the product of Examples 1 and 2.

Example 3

A solution made up of 8.6 parts of anthanthrone and 105 parts of oleum containing 3.6% $SO_3$ was charged into a glass-lined pressure reaction vessel, and 8.2 parts of iodine were added. The reaction vessel was closed and the mixture heated at 130° for 17 hours. The iodination product was isolated in the manner described in Example 1. 6 parts of diiodo-anthanthrone (corresponding to 39% of theory) were obtained, yielding violet shades of excellent light fastness on cotton fabrics when applied by vat dyeing procedures.

Variations can be made in the procedures of the foregoing examples without departing from the scope of the invention. Thus, instead of anthanthrone or 1,1'-dinaphthyl-8,8'-dicarboxylic acid, halogen derivatives thereof containing, for example, chlorine or bromine as a nuclear substituent can be used as intermediates for iodination in accordance with my invention. Instead of a mixture of iodine and bromine or iodine alone, reagents yielding iodine under the reaction conditions, such as bromoiodide, can be employed as the iodinating reagent. Pressures in excess of those disclosed in the examples can also be used, such pressures being at least equal to the pressure autogenously produced.

I claim:

1. In a process for the production of a nuclear iodo-substituted derivative of an anthanthrone compound by replacement of nuclear hydrogen in said compound with iodine and which comprises heating said compound with iodine in oleum, the improvement which comprises carrying out the reaction in a closed vessel at a pressure at least equal to the pressure autogenously produced by the reaction mixture.

2. In a process for the production of a nuclear iodo-substituted derivative of an anthanthrone compound by replacement of nuclear hydrogen in said compound with iodine and which comprises heating said compound with iodine in oleum, the improvement which comprises carrying out the reaction at a temperature of 110–150° C. in a closed reaction vessel at a pressure at least 70 lbs. per square inch above atmospheric pressure.

3. A process for the production of an iodo-anthanthrone compound which comprises heating a compound of the class consisting of anthanthrone, its nuclear chloro- and bromo- substitution products, and the 1,1'-dinaphthyl-8,8'-dicarboxylic acids corresponding thereto, with iodine in oleum at a temperature of 110–150° C. in a closed reaction vessel at a pressure at least equal to the pressure autogenously produced by the reaction mixture.

4. A process as defined in claim 3, wherein the oleum contains 1–12% $SO_3$ and the pressure is at least 70 lbs. per square inch above atmospheric pressure.

5. A process as defined in claim 3 wherein the oleum contains 1–12% $SO_3$, the amount of iodine is in excess up to about 30% of the amount theoretically required for reaction with the amount of the compound to be iodinated, and the reaction temperature is from 120–140° C.

6. A process for the production of iodobromoanthanthrone, which comprises heating anthanthrone with iodine and bromine in amounts corresponding to an excess of up to 30% and up to 20% respectively of the amounts theoretically required for iodobromination of the anthanthrone employed, in oleum containing 1 to 12% $SO_3$ at a temperature of 120 to 140° C. for a period of 5 to 20 hours at a pressure of 70 to 80 pounds per square inch above atmospheric pressure.

7. A process for the production of di-iodo-anthanthrone, which comprises heating anthanthrone with iodine in an amount corresponding to an excess of up to 30% of the amount theoretically required for di-iodination of the anthanthrone employed, in oleum containing 1 to 12% $SO_3$ at a temperature of 120 to 140° C. for a period of 5 to 20 hours at a pressure of 70 to 80 pounds per square inch above atmospheric pressure.

DAVID I. RANDALL.

REFERENCES CITED

The following references are of record in the file of this patent:

UNITED STATES PATENTS

| Number | Name | Date |
|---|---|---|
| 1,876,974 | Kunz et al. | Sept. 13, 1932 |
| 1,916,312 | Herz et al. | July 4, 1933 |

OTHER REFERENCES

Houben "Die Methoden der Organischen Chemie," vol. 3 (Am. ed. 1943) pp. XXXV and XXXVI.